United States Patent [19]

Tomita et al.

[11] Patent Number: 4,539,113
[45] Date of Patent: Sep. 3, 1985

[54] FLUORORESIN FILTER

[75] Inventors: Kazuichi Tomita; Hiroshi Mano; Fumio Matsuyama; Akihiko Isomura, all of Osaka, Japan

[73] Assignee: Sumitomo Electric Industries, Ltd., Japan

[21] Appl. No.: 629,036

[22] Filed: Jul. 9, 1984

[30] Foreign Application Priority Data

Jul. 8, 1983 [JP] Japan ................. 58-125070
Mar. 3, 1984 [JP] Japan ............. 59-30979[U]

[51] Int. Cl.³ ............................................. B01D 29/30
[52] U.S. Cl. ................................. 210/323.2; 55/158; 55/528; 210/500.1; 210/500.2
[58] Field of Search ............... 210/500.1, 500.2, 323.2; 55/158, 528

[56] References Cited

U.S. PATENT DOCUMENTS

| 3,503,516 | 3/1970 | Harms et al. | 210/232.2 |
| 3,843,570 | 10/1974 | Murayama | 210/500.1 |
| 3,950,255 | 4/1976 | Ishii et al. | 210/500.2 |
| 3,977,967 | 8/1976 | Trulson et al. | 210/500.2 |
| 4,248,924 | 2/1981 | Okita | 210/500.2 |
| 4,456,061 | 6/1984 | Swift, Jr. et al. | 210/232.2 |
| 4,461,707 | 7/1984 | Thayer et al. | 210/232.2 |

FOREIGN PATENT DOCUMENTS 1357201 6/1974 United Kingdom ............. 210/232.2

Primary Examiner—Tim Miles
Attorney, Agent, or Firm—Sughrue, Mion, Zinn, Macpeak, and Seas

[57] ABSTRACT

A precision filter made entirely of fluororesin having both a high corrosion and high heat resistance. A plurality of tubular filtering elements are arranged in a fluororesin container. Each tubular filtering element has a polytetraethylene tubular filtering film closed at one end and arranged over or inserted into a fluororesin tubular support. The tubular filtering elements are connected to a cover structure, on the inner surface of which is formed a groove for communicating the tubular filtering elements to one of the liquid inlet and liquid outlet provided in the cover structure.

16 Claims, 18 Drawing Figures

FIG. 11

FLUORORESIN FILTER

BACKGROUND OF THE INVENTION

The prevent invention relates to a filter having an excellent corrosion and heat resistance (resistance to damage caused by heating), all the components of which are made of fluororesin.

There are available a variety of filters for removing particles from a liquid or gas with high precision. However, precision filters having simultaneously a high corrosion and heat resistance are not practically available. Most conventional filters employing a filtering film (membrane) of fluororesin use materials of low corrosion resistance and heat resistance for other components thereof. Thus, the properties of these materials limit the use of the filters. Furthermore, almost all conventional filters use rubber packings as sealing members, and are thus disadvantageous in having a low corrosion resistance. In addition, in the conventional filters, the area of the filtering film per unit volume is small, and therefore it is often difficult to attain a large rate of filtration.

SUMMARY OF THE INVENTION

Accordingly, an object of the present invention is to provide a precision filter made of fluororesin in its entirety in which the above-described difficulties accompanying a conventional filter have been eliminated and both the corrosion resistance and heat resistance are high.

The filter according to the invention employs PTFE porous film, which is excellent as a precision filtering film, and a fluororesin support. All components are made of fluororesin. Accordingly, the filter provides good performance in removing particles from fluids and has a large rate of filtration. Furthermore, the filter is excellent in corrosion and heat resistance. Accordingly, the filter can be used for filtering almost any kind of fluid, and can effectively process corrosive or high temperature fluids, which were heretofore difficult to filter.

DESCRIPTION OF THE PREFERRED EMBODIMENTS

The present invention will be described in detail with reference to preferred embodiments.

A tubular filtering film of polytetrafluoroethylene (hereinafter abbreviated as "PTFE", when applicable) closed at one end, which is suitably used in the invention, is obtained by forming a tube closed at one end with a sheet-like or tube-like PTFE porous film. Such tubes, which can have a pore diameter as desired, generally in a range of 0.01 to 100 microns, are selected according to the application at hand. A suitable tube can be obtained by fabricating a tube closed at one end with a sheet-like or tube-like PTFE porous film produced according to the drawing-sintering method. Producing a PTFE porous film according to the drawing-sintering method, a method disclosed by Japanese Published Patent Application No. 13560/1967 may be employed. The specific feature of the PTFE porous film manufactured according to this method is the attainment of a microstructure including fibers and knots coupled to one another by the fibers. Furthermore, the PTFE porous film has a high mechanical strength, and a small and uniform pore diameter. In addition, a PTFE porous film of large porosity can be manufactured according to this method which has a large filtration rate per unit area. Thus, the PTFE porous film is very suitable as a filtering film.

Figure 1A:
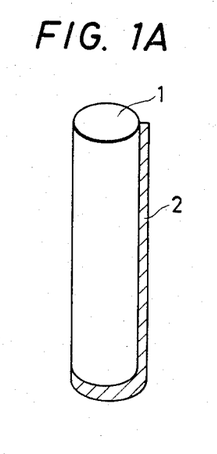
FIG. 1A is a perspective view showing an example of a tubular filtering film made of a sheet-like PTFE porous film.
Figure 1B:
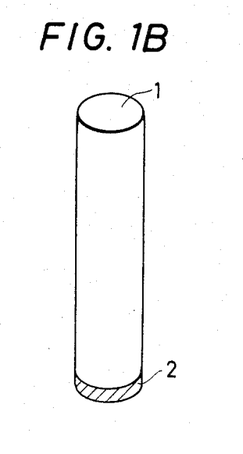
FIG. 1B is a perspective view showing an example of a tubular filtering film made of a tube-like PTFE porous film.

A tube closed at one end as shown in FIG. 1A can be formed by bonding the PTFE porous sheet. In order to bond the PTFE porous sheet as described, the sheet is folded in two and then heated under pressure to at least the melting point (about 327° C.) of PTFE. The bonding of the sheet may be achieved also by folding the sheet in two, inserting a fluororesin film or powder between the two parts of the sheet thus folded and heating the sheet under pressure to at least the melting point of the fluororesin so that the fluorine resin flows into the pores in the PTFE porous film. Examples of the fluororesin used for this purpose are tetrafluoroethylene-hexafluoropropylene copolymer (FEP), tetrafluoroethylene-perfluoroalkylvinylether copolymer (PFA), tetrafluoroethylene-ethylene copolymer (ETFE), polychlorotrifluoroethylene (PCTFE), polyvinylidenefluoride (PVdF), polyvinylfluoride (PVF) and chlorotrifluoroethylene-ethylene copolymer (ECTFE). Especially when it is required for the fluororesin to have a high heat resistance and corrosion resistance, FEP or PFA should be used.

In accordance with the invention, two PTFE porous films of different pore diameters are laid one on another.

This is done to allow the PTFE porous film of larger pore diameter to act a a prefilter to prevent the pores from being clogged and to provide a filter strong enough to withstand expected maximum reverse pressures. The combination of a PTFE porous film 0.01 to 100 microns in pore diameter and a PTFE porous film 0.1 to 500 microns in pore diameter is preferable.

A sintered porous tube formed by molding and sintering PTFE particles is suitable as a tubular support of fluororesin. In general, sintered porous tubes having 0.1 micron to 1 mm pore diameters are used. However, a sintered porous tube having a larger pore diameter than the filtering film should be used to effectively lower the filtration resistance. This sintered porous tube is useful especially as a tubular support because it permits easy permeation and suffers little deformation.

Figure 2A:
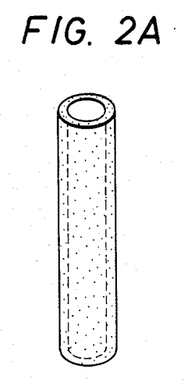
FIG. 2A is a perspective view showing an example of a sintered porous tube fabricated by molding and sintering PTFE particles.
Figure 2B:
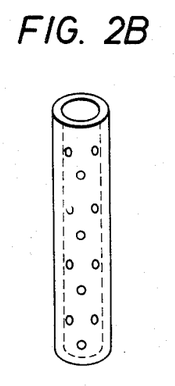
FIG. 2B is a perspective view showing an example of a fluororesin porous tube.
Figure 2C:
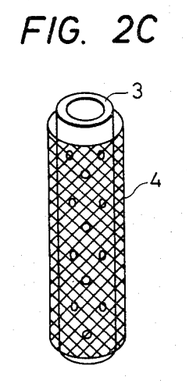
FIG. 2C is a perspective view showing an example of a tubular support obtained by enclosing a fluororesin porous tube with a fluororesin net.

A suitable example of the tubular support of fluororesin is a laminate which includes a first layer composed of a fluororesin net-like mold or unwoven cloth and a second layer composed of a fluororesin porous tube. The fluororesin net-like mold or unwoven cloth is employed to increase the effective area of the filtering film. In order to decrease the filtration resistance, it is essential that the net-like mold or unwoven cloth have a larger pore diameter than the filtering film. The fluororesin net-like mold may be a net formed by molding fluororesin, or a cloth of fluororesin. The fluororesin porous tube generally has a structure including, as shown in FIG. 2B, through-holes about 0.5 to 10 mm in diameter formed in a fluororesin tube. The through-holes are generally circular although they may have other configurations. The fluororesin net-like mold or unwoven cloth is laid over either the outer or inner surface of the fluororesin porous tube. In an external pressure type filter in which the direction of fluid flow is from the outside to the inside of the tube, the fluororesin net-like mold or unwoven cloth is laid over the outer surface of the fluororesin porous tube as shown in FIG. 2C. In an internal pressure type filter in which the direction of fluid flow is from the inside to the outside, the fluororesin net-like mold or unwoven cloth is laid over the inner surface of the fluororesin porous tube. Examples of a fluororesin suitable for forming the tubular support are PTFE, FEP, PFA, ETFE, PCTFE, PVdF, PVF and ECTFE. Among these materials, PTFE, FEP or PFA is suitable in the case where the tubular support must have a high heat and corrosion resistance.

The PTFE tubular filtering film closed at one end is placed over or inserted into the fluororesin tubular support. In this case also, in an external pressure type filter in which the fluid flows into the inside of the tube through its wall, the PTFE tubular filtering film is placed over the outside of the fluororesin tubular support, and in an internal pressure type filter in which the fluid flows out of the tube through the wall, the PTFE tubular filtering film is inserted into the fluororesin tubular support.

The PTFE tubular filtering film may be closed at one end in advance, or one end of the PTFE tubular filtering film may be joined to the fluororesin tubular support to close it at one end. The combination of the PTFE tubular filtering film and the fluororesin tubular support forms a tubular filtering element according to the invention.

Figure 3A:
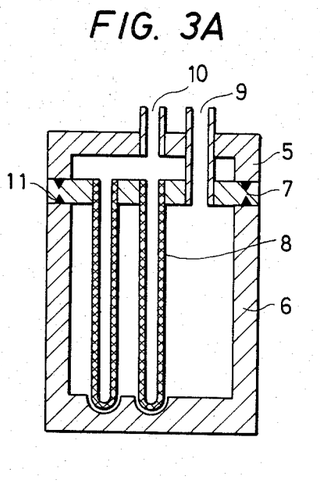
FIGS. 3A and 3B are sectional views showing examples of a filter.
Figure 3B:
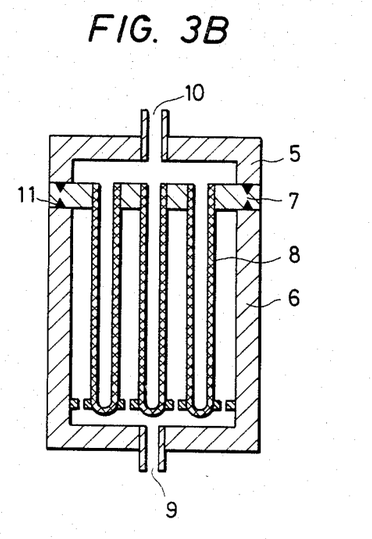

One or a plurality of tubular filtering elements are arranged in a fluororesin container. Examples of the fluororesin of the container are the same as those of the tubular support. Examples of the arrangement of the tubular filtering elements are shown in FIGS. 3A and 3B. The fluororesin container is composed of an outer container 5 and 6 and a supporting board 7. As shown in FIG. 3A, an inlet and an outlet for fluid are provided on the same side of the container. In the case of FIG. 3B, the inlet and the outlet are provided at opposite sides of the container. The tubular filtering elements 8 have open ends tightly secured to a supporting board 7. In arrangements of FIGS. 3A and 3B, in the case where the fluid flows into the tubular filtering elements 8 through the walls for filtration, a pipe 9 is used as the inlet and a pipe 10 is used as the outlet, and in the case where the fluid flows out of the tubular filtering elements 8 through the walls for filtration, the pipe 9 is used as the outlet and the pipe 10 is used as the inlet.

Figures 4, 5A, 5B, 5C:
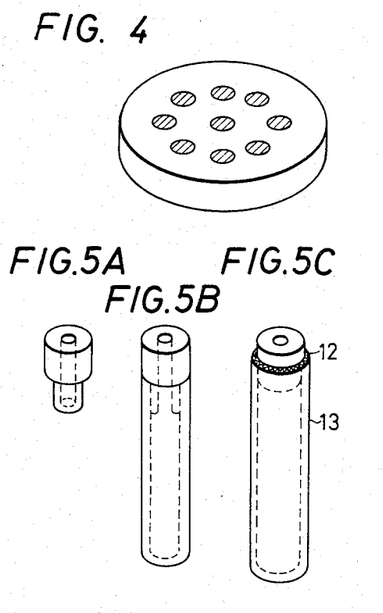
FIG. 4 is a perspective view of an example of a supporting board in the filter.
FIG. 5A is a perspective view showing a connecting part.
FIG. 5B is a perspective view showing the combination of the connecting part and the tubular support.
FIG. 5C is a perspective view showing a PTFE tubular filtering film which has been bonded.

A typical example of the supporting board 7 is a disc having through-holes as shown in FIG. 4. The tubular filtering elements may be sealingly secured to the supporting board using a tapered thread or thermal fusion or both. It should be noted that thermal fusion includes applying pressure with a jig heated to higher than the melting point of the resin, heating with high frequency induction energy, and utilizing ultrasonic waves. Alternatively, the tubular filtering elements may be secured to the supporting board through connecting parts of fluororesin. Examples of suitable connecting parts are as shown in FIGS. 5A, 5B and 5C. A first example of a connecting part is shown in FIG. 5A, and a combination of the connecting part and tubular support is shown in FIG. 5B. FIG. 5C shows a PTFE tubular filtering film 13 fitted and bonded, in a region 12, to the tubular support.

Figure 6:
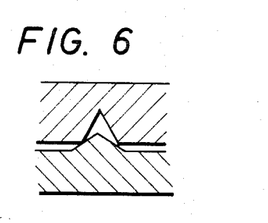
FIG. 6 is an explanatory diagram illustrating an example of a sealing method.

The open end of each tubular filtering film is sealingly fixed to the tubular support or connecting part by thermally bonding it thereto or by inserting it into the fixing threaded part. The closed end of each tubular filtering element is fixed by the bottom of the container (as shown in FIG. 3A) or by a suitable supporting plate (FIG. 3B). The supporting board can be sealingly connected to the outer container by thermal bonding, a threaded connection or fluororesin O-rings. Furthermore, an engaging structure as shown in FIG. 6 can be employed so that compression is applied from both sides, which is especially effective. The fluororesin container can be suitably compressed after being placed in a metal or resin container with flanges. This approach is advantageous in that the pressure withstanding strength is increased. In this case also, the corrosion resistance is not lowered because only the fluororesin container is in contact with the fluid.

Examples of fluids which can be filtered by the filter of the invention are water, organic solvents, various solutions, and various gases. When water, solutions or liquids such as some organic solvents having a relatively large surface tension are filtered, an opening section with a breather valve should be provided for the container. The breather valve can be made of a fluororesin porous material so as to prevent transmission of liquid and permit transmission of gas. Accordingly, under usual filtration conditions, a liquid under filtration cannot pass through it.

The above-described fluororesin porous material is most suitable for manufacturing the breather valve. The pore diameter of the fluororesin porous material should be selected according to the liquid surface tension and the filtration pressure, which are in turn determined by the type and temperature of the liquid to be filtered. It is necessary, as the liquid surface tension decreases and the filtration pressure increases, for the pore diameter of the fluororesin porous material to be decreased. The best example of the fluororesin porous material is also PTFE. In general, the breather valve can be attached to the container by bonding or mechanically sealing its peripheral portion to the opening section of the filter.

In an example for which the PTFE porous structure was in the form of a sheet 0.1 mm in thickness and water at a temperature was filtered, the following results were obtained: When the porous structure had an average pore diameter of 1.0 micron, it prevented the transmission of water under pressure of up to 1.1 kg/cm$^2$. When the porous structure had an average pore diameter of 0.45 micron, it blocked the passage of water under pressure of up to 2.5 kg/cm$^2$. When the porous structure had an average pore diameter of 0.22 micron, it prevented the transmission of water. In any case, it exhibited an excellent gas permeability.

Figure 7:
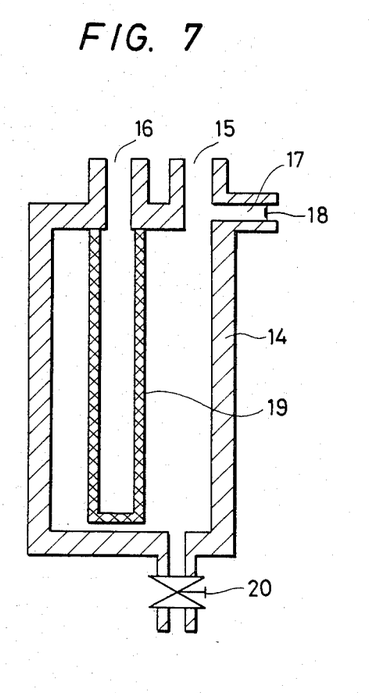
FIG. 7 is a sectional view showing an example of a filter with a breather valve.

The breather valve is provided for at least one opening of the filter. In general, the breather valve is provided at the upper portion of the liquid inlet side of the filter. However, it may be provided on the liquid outlet side if desired. FIG. 7 shows an example of a filter in which the breather valve is provided at the upper portion of the liquid inlet side. The open end of the breather valve may be held open or may be connected to a suitable pipe.

When filtration is carried out with the filter shown in FIG. 7, bubbles coming with the liquid through the liquid inlet are removed from the filter through the breathing valve, and no bubbles are retained above the filtering elements. Thus, the filtration rate is not decreased. In addition, no bubbles are mixed in the filtered liquid. Thus, it can be appreciated that the filter of the invention provides an excellent filtration performance.

When the filter is drained, the breather valve serves as an air sucking inlet, and the sucked air is filtered by the breather valve, as a result of which no foreign matter can pass into the filter and the liquid. Furthermore, at the start of filtration, the breather valve serves as an air discharge outlet to carry out the filtration smoothly.

The filter with the breather valve is considerably effective in the case also where the filtering elements are liquid repellent. For instance, in the case where the filtering elements are made of a fluororesin having a small pore diameter and water is filtered, generally a liquid of small surface tension is used to wet the filtering elements and is then replaced by water to perform the filtration. However, if, in this case, bubbles are mixed in the water, the filtering elements can be locally dried by the bubbles, thus becoming water repellent again. As a result, the effective area of the filtering elements is decreased and the filtration rate is lowered. This difficulty can be eliminated by the employment of the filter according to the invention because gases are discharged through the breather valve.

If the filter is drained, the filtering elements are liable to dry. Therefore, in the subsequent filtration, the previous filtration rate cannot be attained. However, in the filter of the invention, air is sucked in or discharged out of the filter through the breather valve in draining the filter or in supplying liquid into the filter again, and therefore the filtering elements will not dry and the filtration rate is not lowered.

Further specific examples of a filter according to the invention will be described.

Figure 8:
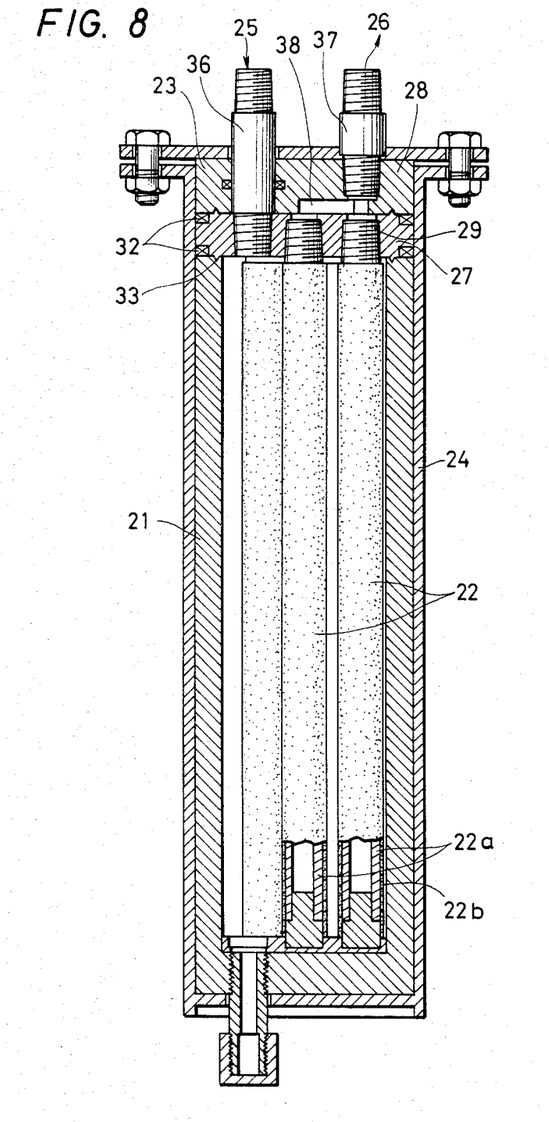
FIG. 8 is a vertical sectional view showing an example of a filter according to the invention.

The fundamental construction of a filter according to the invention is as shown in FIG. 8. The filter includes a container 21 opened at one end; a plurality of tubular filtering elements 22 accommodated in the container 21; a cover structure 23 adapted to hold the tubular filtering elements 22 and to cover the container 21, the container 21, the tubular filter elements 22 and the cover structure 23 being made of fluororesin; and an outer casing 24 into which the container 21, the tubular filtering elements 22 and the cover structure 23 are inserted in a compressed state.

Fluid flows into the container 21 through an inlet 25 in the cover structure 23 and is filtered while passing into the tubular filtering elements 22 through their walls. The fluid thus filtered is discharged through an outlet 26.

In general, in a filter the sealing of connected parts or closed parts in the fluid flow passages greatly affects the filtering performance. In the above-described precision filter also, gas-tight or water-tight connecting structures or sealing structures must be employed for the connection of the tubular filtering elements 22 and the outlet 26 and for the closure of the container 21 with the cover structure. However, since a fluororesin such as the tetrafluoroethylene resin used to form the cover structure 23 and other components is liable to be permanently deformed by compression, in forming connections for passage in the cover structure 23, it is necessary to employ a structure which prevents the deformation of the cover structure 23.

In the filter according to the invention, the container accommodating the tubular filtering elements is closed with the cover structure, and a communicating groove is formed in the cover structure to communicate one of the inlet and outlet to the tubular filtering elements. The communicating groove is C-shaped so that there is little reduction in the material of the cover structure, thus preventing a condition which exacerbates the deformation of the cover structure.

Figure 9:
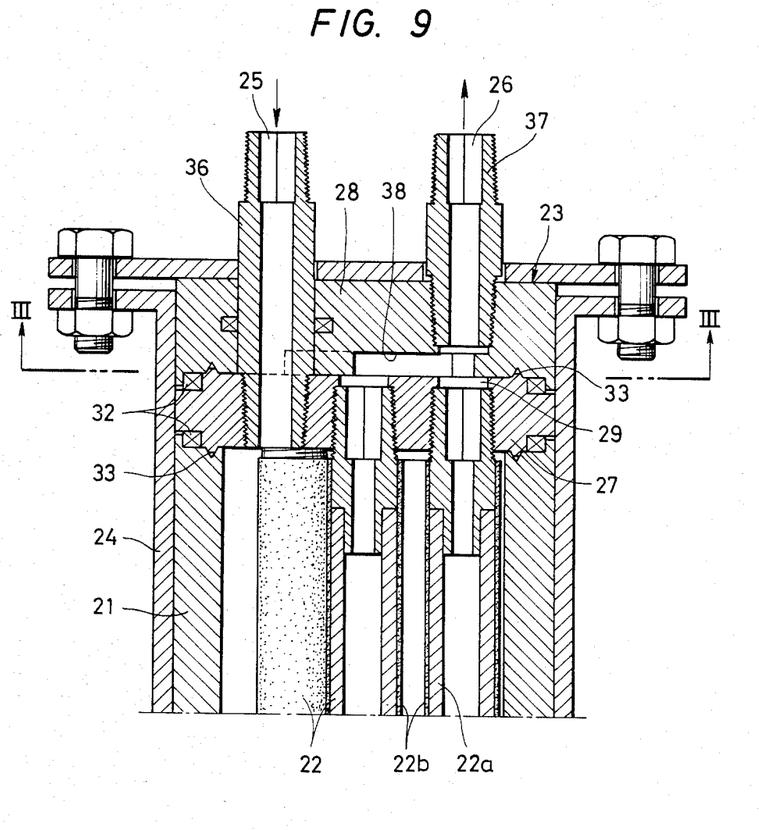
FIG. 9 is an enlarged sectional view showing essential components of the filter of FIG. 8.

As shown in FIG. 9, the cover structure 23 used to cover the container includes a supporting board 27 to which a plurality of tubular filtering elements 22 are secured, and a fixing board 28 located on the outer surface of the supporting board 27. The supporting board 27 and the fixing board 28 have the form of discs made of fluororesin. The diameters of the discs are equal to the outside diameter of the container 21. A plurality of through-holes 29 are formed in the supporting board 27 at its center and around the center. The upper ends of the tubular filtering element 22 are coupled to the through-holes 29 thus formed.

Figure 12:
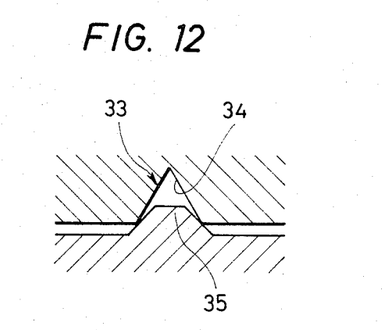
FIG. 12 is a sectional view of a groove seal in the filter of FIG. 8.

Sealing structures are provided at the peripheries of the engaging surfaces of the supporting board 27 and the container 21 and also at the peripheries of the engaging surfaces of the supporting board 27 and the fixing board 28 so as to seal the surfaces gas-tightly and water-tightly. Each sealing structure includes a seal 32 which is provided by inserting an O-ring 31 in a fluororesin ring 30 which is U-shaped in section, and a groove seal 33 which is provided inside of the seal 32. This arrangement provides an improved sealing effect. The groove seal 33 has a V-shaped groove 34 cut in one of the engaging surface, and a V-shaped protrusion 35, the angle of which is larger than that of the V-shaped groove 34, so that the V-shaped protrusion 35 abuts against the V-shaped groove at both sides for sealing.

The cover structure 23 has an inlet pipe 36 which penetrates the fixing board 28 and the supporting board 27 to communicate with the inside of the container, and an outlet pipe 37 connected to the fixing board 28. The communicating groove 38 for communicating the outlet pipe 37 to the tubular filtering elements 22 is formed in the engaging surface of the fixing board 28, which is placed on the engaging surface of the supporting board 27.

Figure 10:
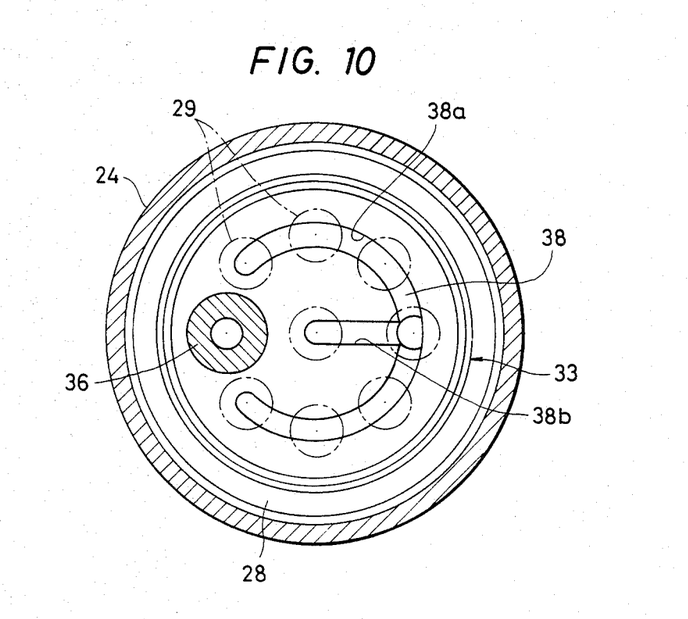
FIG. 10 is a cross-sectional view taken along a line III—III in FIG. 9.
Figure 11:
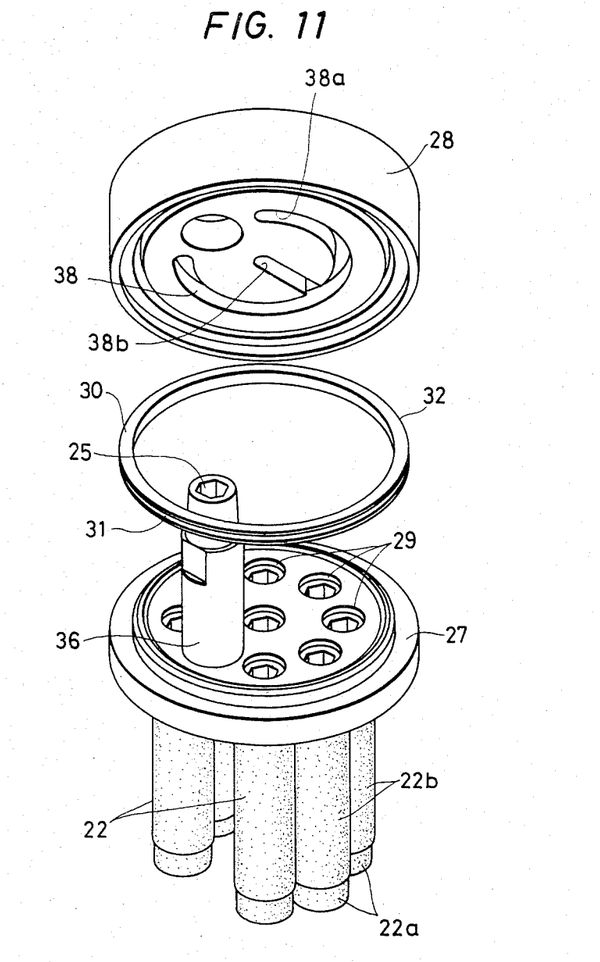
FIG. 11 is an exploded perspective view showing essential components of the filter of FIG. 8.

The communicating groove 38, as shown in FIGS. 10 and 11, is composed of an arcuate part 38a, between both ends of which the inlet pipe 36 extends, and a straight part 38b, communicating the arcuate part 38a with the tubular filtering element provided at the center in such a manner that, when the fixing board 28 is placed on the supporting board 27, the arcuate part 38a communicates with all the tubular filtering elements 22. Accordingly, the fluid supplied into the container 21 through the inlet 25 is filtered while passing into the tubular filtering elements 22 through their walls. The fluid thus filtered is collected at the communicating groove 38 and is then discharged out of the filter through the outlet 26.

We claim:

1. A filter comprising:
   a fluororesin container having a fluid inlet and a fluid outlet; and
   a tubular filtering element arranged in said fluororesin container, said tubular filtering element comprising a polytetrafluoroethylene tubular filtering film closed at one end and placed over or inserted into a fluororesin tubular support.

2. The filter as claimed in claim 1, in which said polytetrafluoroethylene tubular filtering film has a pore diameter of 0.01 to 100 microns.

3. The filter as claimed in claim 1, in which said polytetrafluoroethylene tubular filtering film has a microstructure including fibers and knots coupled through said fibers to one another.

4. The filter as claimed in claim 1, in which said polytetrafluoroethylene tubular filtering film comprises two kinds of polytetrafluoroethylene porous films of different pore diameters laid one on the other.

5. The filter as claimed in claim 4, in which one of said two kinds of polytetrafluoroethylene porous films has a pore diameter of 0.01 to 100 microns, and the other has a pore diameter of 0.1 to 500 microns.

6. The filter as claimed in claim 1, in which said fluoroethylene tubular support comprises a sintered porous tube prepared by molding and sintering polytetrafluoroethylene particles.

7. The filter as claimed in claim 6, in which said sintered porous tube has a pore diameter of 0.1 microns to 1 mm.

8. The filter as claimed in claim 1, in which said fluororesin tubular support comprises a laminate including a first layer comprising at least one of a fluororesin netlike mold and unwoven cloth having a larger pore diameter than said filtering film and a second layer comprising a fluororesin porous tube, and said first layer being arranged on the side of said filtering film.

9. The filter as claimed in claim 1, in which said fluororesin tubular support is closed at one end.

10. The filter as claimed in claim 1, in which an open end of said polytetrafluoroethylene tubular filtering film is bonded to said fluororesin tubular support.

11. The filter as claimed in claim 1, in which said fluororesin container has at least one opening in addition to said fluid inlet and said fluid outlet, and further comprising a breather valve, said breather valve being made of a fluororesin porous material for preventing transmission of fluid and permitting transmission of gas, and said breather valve being provided in said opening.

12. The filter as claimed in claim 11, in which said fluororesin porous material is a polytetrafluoroethylene porous material having a microstructure which includes fibers and knots coupled through said fibers to one another.

13. The filter as claimed in claim 11, in which said fluororesin porous material comprises a polytetrafluoroethylene unwoven cloth.

14. The filter as claimed in claim 11, in which said breather valve is provided on a liquid inlet side of said container.

15. A filter comprising:
    a fluororesin container;
    a plurality of tubular filtering elements, each of said tubular filtering elements comprising a polytetrafluoroethylene tubular filtering film closed at one end placed over or inserted into a fluororesin tubular support; and
    a cover structure for tightly closing said container, said cover structure having a liquid inlet and a liquid outlet, said tubular filtering elements being connected to said cover structure, and a communicating groove being formed in said cover structure for communicating said tubular filtering elements to one of said liquid inlet and liquid outlet, said communicating groove being in the form of an arc.

16. The filter as claimed in claim 15, in which said cover structure comprises a supporting board to which said tubular filtering elements are connected and which tightly closes said cover to said container, and a fixing board sealed to said container and located outside of said supporting board, said communicating groove being formed in a surface of said fixing board adjacent said supporting board.

* * * * *